United States Patent [19]

Chandross et al.

[11] 4,132,608
[45] Jan. 2, 1979

[54] TECHNIQUE FOR ELECTRODEPOSITION OF WATER-BASED POLYMERIC COATING

[75] Inventors: Edwin A. Chandross, Berkeley Heights; Donald J. Freed, Westfield, both of N.J.

[73] Assignee: Bell Telephone Laboratories, Incorporated, Murray Hill, N.J.

[21] Appl. No.: 775,770

[22] Filed: Mar. 9, 1977

[51] Int. Cl.$^2$ .................. C25D 10/00; C25D 5/02; C25D 11/00
[52] U.S. Cl. .................................. 204/27; 204/15; 204/28; 204/56 R; 204/181 R
[58] Field of Search ................. 204/181 R, 15, 27, 28, 204/56 R

[56] References Cited

U.S. PATENT DOCUMENTS

| | | | |
|---|---|---|---|
| 3,547,790 | 12/1970 | Dannels et al. | 204/27 |
| 3,809,634 | 5/1974 | Brown et al. | 204/181 |
| 3,984,382 | 10/1976 | Parekh et al. | 204/56 R |
| 4,000,045 | 12/1976 | Rotzow | 204/15 |

Primary Examiner—Howard S. Williams
Attorney, Agent, or Firm—Edward M. Fink

[57] ABSTRACT

A water-based polymeric coating comprising a novolak resin is deposited electrolytically from a solution of a novolak resin upon a conductive substrate at an initial current density ranging from 10-30 milliamperes per square centimeter. The resultant coating, after cross linking by subsequent chemical treatment, is flexible, firmly adherent and evidences good thermal stability and insulation characteristics, so suggesting its use as a cover coat for printed circuits.

6 Claims, 1 Drawing Figure

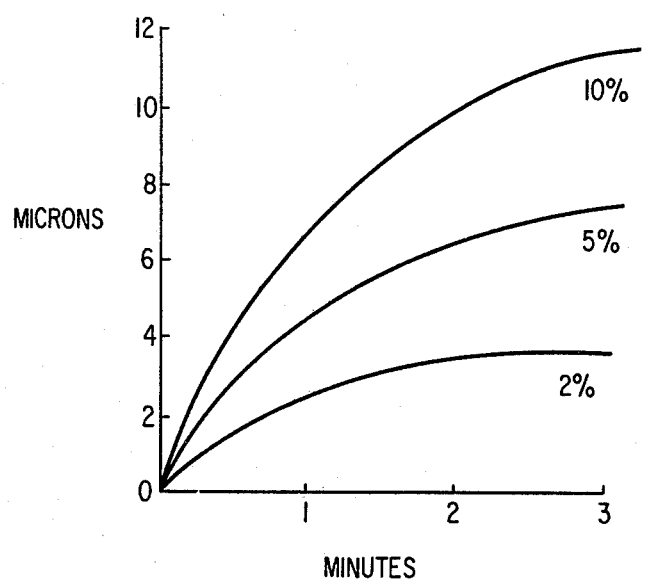

TECHNIQUE FOR ELECTRODEPOSITION OF WATER-BASED POLYMERIC COATING

This invention relates to a method for depositing protective coatings upon metal articles. More particularly, the present invention relates to a method for the electrodeposition of a water based polymeric coating upon metal articles.

In recent years, the widespread use of printed circuit boards in the electronics industry has created a need for protective coatings evidencing high electrical resistance, satisfactory thermal and hydrolytic stability, flexibility, and adhesion characteristics required to assure adhesion to the substrate. Additionally, it is essential that the protective coating be non-corrosive to metals normally used on such circuit boards.

Heretofore, a wide variety of organic polymers have been used for this purpose. Unfortunately, most of the polymeric materials have not met the demanding requirements placed upon them, so restricting the number of compositions available for this purpose.

In accordance with the present invention, a technique for obviating the foregoing prior art limitations is described. Briefly, the inventive technique involves providing an electrolytic cell including an electrolyte, comprising a solution of a novolak resin, immersing cathode and anode members in the electrolyte and impressing a difference of potential across the cathode and anode, so resulting in the electrolytic deposition of a polymeric coating upon the anode which is then converted to its final form by reaction with a crosslinking agent.

The invention will be more readily understood by reference to the following detailed description taken in conjunction with the accompanying drawing wherein the FIGURE is a graphical representation on coordinates of time in minutes against thickness in microns showing electrodeposition rates for novolak resin solutions of varying concentrations.

In the practice of the present invention, metal articles to be coated are made the anode in the electrolytic system employed. Metals suitable for this purpose have conductive surfaces which are compatible with alkaline media. Typical of such materials suitable for this use is copper. The cathode employed may be selected from among any conventional material used as a cathode in electroplating processes. Nickel, platinum and copper are typical of the materials used for this purpose.

The electrolyte chosen for use in the inventive technique is an aqueous alkaline solution of a novolak resin selected from the group consisting of phenolformaldehyde and cresol-formaldehyde copolymers and mixtures thereof, the molecular weight of the copolymer ranging from 1,500–6,000. As indicated, the electrolyte solution is alkaline in nature and suitable solvents for dissolution of the novolak resin are chosen from among aqueous solutions of the alkali metal hydroxides or carbonates which may optionally contain alkanols having from 1–4 carbon atoms, as cosolvents, the concentration of the base ranging from 0.1–0.5 molar dependent upon the molecular weight of the polymer chosen, the higher the molecular weight the more base being required. The electrolyte is conveniently prepared as 2-20 percent solution in the alkaline medium preferably 2–10 percent, the range of interest being dictated by practical considerations.

In the operation of the process, a difference of potential is applied across the anode and cathode so resulting in oxidation of hydroxyl ions and phenolate ions at the anode in accordance with the following equation:

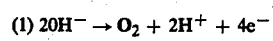

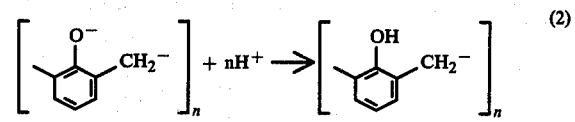

Thus, hydrogen ions act to neutralize both hydroxyl ions and the polymer which becomes less soluble and precipitates at the electrode surface. Also occurring, during the course of the reaction is a known facile oxidation of phenolate ions to phenoxy radicals which, subsequently, undergo a coupling and isomerization reaction to yield biphenols in accordance with the following equation:

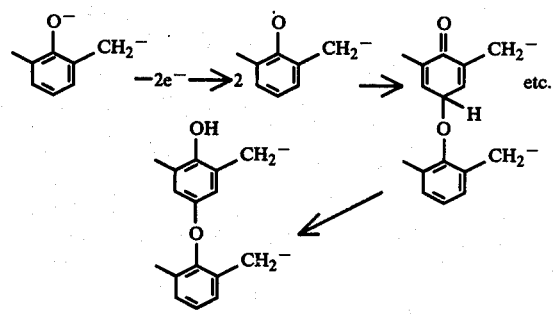

These coupling reactions also lead to cross linking and result in an increase in the molecular weight of the polymer and concurrent decrease in solubility which also leads to precipitation of the polymer at the anode surface.

Suitable operating conditions for the electrolytic treatment are an initial current density ranging from 10–30 milliamperes per square centimeter, specific values being dictated by cell geometry. Studies have shown that the use of an initial current density greater than 30 milliamperes per square centimeter results in the evolution of gas at the anode surface, thereby competing with deposition of the polymer. The lower limit of ten milliamperes per square centimeter is controlled solely by practical considerations relating to the rate of deposition of the polymer.

Electrodeposition is continued for a time period sufficient to yield a polymer coating ranging from 0.5 micron to approximately 20 microns, thickness being limited to polymer concentration and time.

With reference now to the FIGURE, there is shown a graphical representation on coordinates of deposition time in minutes against thickness in microns showing varying deposition rates for novolak resin-electrolyte solutions having concentrations ranging from 2–20 percent in accordance with the present invention. Analysis of the graph reveals that typical deposition times range from about 1–3 minutes and yield coatings in thicknesses ranging from 2–12 microns.

Following electrodeposition, the coated article is removed from the bath and dipped, after air drying, in a hardening agent which is capable of effecting cross linking. Suitable materials for this purpose include aqueous formaldehyde solutions or a trialkoxy silane in an appropriate organic solvent which does not attack the novolak. The next step in the deposition process involves baking the resultant film at a temperature ranging from 150°–250° C for a time period ranging from 2–5 minutes, the shorter time periods corresponding with the higher temperatures and the converse. The purpose of the baking step is to drive off excess water trapped in the polymer film and to effect the cross linking reaction.

A specific embodiment of the electrodeposition process in accordance with the invention is shown in the following example.

EXAMPLE I

A plating solution was prepared by dissolving 3.5 grams of a phenol-formaldehyde novolak resin having a molecular weight of 4,000 in 50 milliliters of a 0.2 molar solution of potassium hydroxide in distilled water. The electrolyte was added to an electroplating cell having a nickel cathode member and the article to be plated, namely, a copper strip of ten square centimeters in area inserted into the cell. Then, with the copper strip serving as anode, a voltage of 7.5 volts was impressed across anode and cathode with an initial current density of five milliamperes per square centimeter. After three minutes the copper strip was removed and rinsed in distilled water dipped into an aqueous formaldehyde solution, air dried and baked at 200° C for five minutes. The resultant film was found to be an adherent, continuous smooth polymer film having a thickness of about three micrometers.

Further analysis of the polymeric films prepared in accordance with the invention revealed the films were highly heat resistant and were insoluble in common organic solvents or aqueous bases or acids. Further tests were run by taking several partially coated pieces of copper and dipping the coated pieces in a solder bath maintained at 250° C. After 15 seconds, the unplated areas had been completely covered with solder whereas the coated areas remained untouched and appeared to be identical to pieces which had not been subjected to treatment. After flexing several films coated on a flexible copper strip, microscopic examinations were made and no cracks were observed. Finally, the electrical resistance of a coated film having an area of approximately one square centimeter was measured and found to be greater than ten megohms.

EXAMPLE II

A copper wire (one millimeter in diameter times five centimeters long) was made the anode in an aqueous solution of potassium hydroxide (0.2 molar) and phenol formaldehyde polymer (50 grams per liter). The cathode was a strip of nickel. Under an impressed voltage of 7.5 volts the initial current of 12 milliamperes decayed to 0.06 milliamperes over a period of three minutes. The wire was then removed, washed well with distilled water and air dried. It was then immersed for three minutes in a solution of amyltrimethoxy silane (10%) in Freon 113. The wire was then kept in a 150° C oven for five minutes. This resulted in a smooth adherent gold-colored coating of approximately four micrometers thickness. The coating was not removed or affected by common organic solutions.

It will be appreciated by those skilled in the art that films prepared in accordance with the present invention evidenced chemical and physical properties which are satisfactory for protective coatings not only for flexible circuits but also for wire and cable insulation. Additionally, it will be appreciated that the thin coatings prepared comprise but a small fraction of the total organic material used in a flexible circuit, and obviate the need for fire retardants, a factor which is of particular significance since halides commonly used for this purpose are potentially corrosive to metal surfaces.

What is claimed is:

1. Method for the electrodeposition of a water based polymeric coating having a thickness ranging from 2 to 12 microns upon wire, cable and the conductive portion of printed circuit boards which comprises the steps of:
    (a) providing an electrolytic cell containing an electrolyte comprising an aqueous 2–20 percent alkaline solution of a novolak resin having a molarity ranging from 0.1 to 0.5, said resin being selected from the group consisting of phenol formaldehyde copolymers, cresol formaldehyde copolymers and mixtures thereof, the molecular weight of the resin ranging from 1,500–6,000,
    (b) immersing cathode and anode members in the electrolyte, the anode member providing the conductive substrate to be coated,
    (c) impressing a difference of potential across the anode and cathode such that the initial current density ranges from 10–30 milliamperes per square centimeter thereby resulting in electrolytic deposition of a polymeric coating on the anode,
    (d) cross linking the said coating with a cross linking agent, and
    (e) baking the resultant cross linked coating at a temperature ranging from 150°–250° C for a time period ranging from 2–5 minutes.

2. Method in accordance with claim 1 wherein the cross linking agent is an aqueous formaldehyde solution.

3. Method in accordance with claim 1 wherein the cross linking agent is a trialkoxy silane in an organic solvent.

4. Method in accordance with claim 1 wherein the alkaline solution is selected from the group consisting of aqueous solutions of alkali metal hydroxides and alkali metal carbonates.

5. Method in accordance with claim 1 wherein the novolak resin is a phenol formaldehyde copolymer.

6. Method in accordance with claim 5 wherein the concentration of the resin in solution ranges from 2–10 percent.

* * * * *